June 2, 1925. 1,539,956
O. RODHE
ELECTRICAL INDICATING OR RECORDING MEANS FOR GAS ANALYZING APPARATUS
Filed Dec. 9, 1922
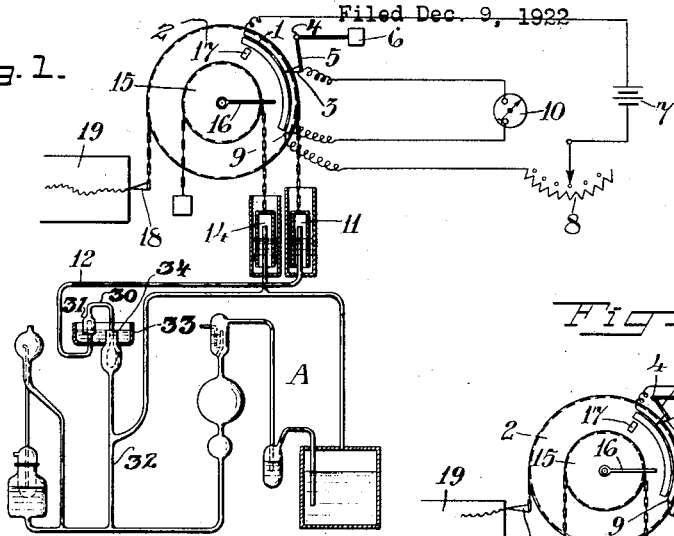
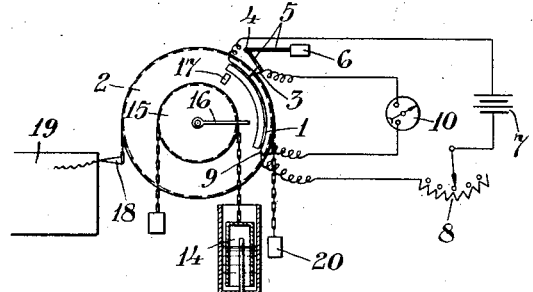
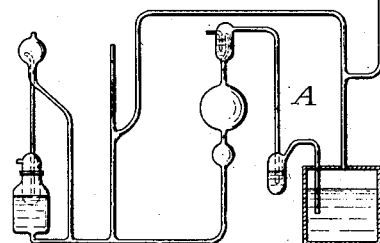
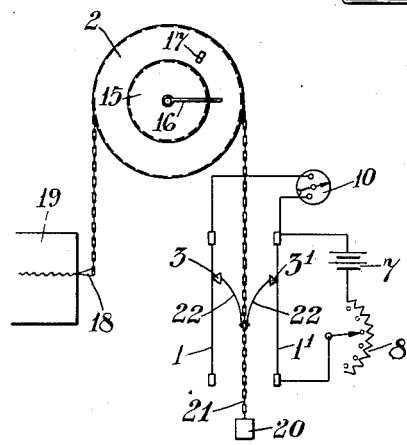
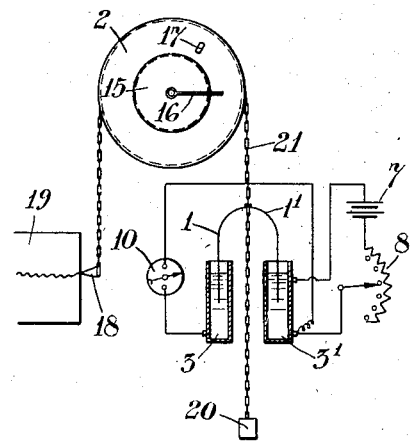
Inventor
Olof Rodhe Patented June 2, 1925.

1,539,956

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION OF SWEDEN.

ELECTRICAL INDICATING OR RECORDING MEANS FOR GAS-ANALYZING APPARATUS.

Application filed December 9, 1922. Serial No. 605,989.

*To all whom it may concern:*

Be it known that I, OLOF RODHE, a subject of the King of Sweden, residing at Odengatan 54 A, Stockholm, Sweden, have invented certain new and useful Improvements in Electrical Indicating or Recording Means for Gas-Analyzing Apparatus, of which the following is a specification.

The present invention refers to electrical means for indicating or recording the results of analyses in gas analyzing apparatus, especially in discontinuously operating apparatus.

According to the invention, an electrical measuring apparatus or the like is provided with an adjustable resistance inserted in the circuit thereof and adapted to be set by the operation of any of the members, which in different compositions of the gas mixture to be analyzed are brought into different positions corresponding thereto in order to convert the results of the analyses into electrical variations. In the electrical measuring apparatus the results of the analyses may be indicated by a pointer and a scale, or they may be recorded on a chart.

The invention is especially adapted to be used in connection with discontinuously operating gas analyzing apparatus, the resistance being preferably arranged to be set by a member in the gas analyzing apparatus, said member being brought in each analysis into a position corresponding to the result of the analysis while it is maintained in the last adjusted position by suitable locking means until the termination of the following analysis has been attained or nearly attained, the said member being then moved into a position corresponding thereto. By this arrangement it is possible in each moment to read off the result of the analysis direct on the electrical apparatus in spite of the discontinuous operation of the said apparatus. On applying the invention to discontinuously operating gas analyzing apparatus of the type provided with a mechanical recording mechanism, on which the results of the analysis are recorded diagrammatically by a stylus or the like, the electrical indicating or recording apparatus may be advantageously combined with said mechanical recording mechanism, preferably in such a manner, that the resistance is adjusted by the movement of the member supporting the stylus or a part connected thereto. If the recording mechanism is provided with means for changing a discontinuous recording operation into a continuous one, a continuous electrical indication or recording of the result of the analysis is obtained by the said arrangement.

The invention will be described more fully with reference to the accompanying drawings, in which Fig. 1 is a view of an embodiment of an electrical indicating or recording device according to the present invention and applied to a gas analyzing apparatus which is provided with locking means in order to attain a continuous record, whereby the member of the apparatus which, for each analysis, is brought to assume a position corresponding to the result of the analysis, is maintained in said position until or nearly until the termination of the following analysis shall have been reached, when the said member is brought into a new position corresponding thereto.

Fig. 2 shows the indicating device illustrated in Fig. 1 and applied to a discontinuously recording gas analyzing apparatus.

Fig. 3 shows another embodiment and

Fig. 4 a third embodiment of the device.

Referring to Fig. 1, 1 is an electrical resistance wire, stretched out suitably after a circular arc on a wheel 2, which, for each analysis, is brought into a position corresponding to the result of the analysis. Bearing on the resistance wire 1 is a contact piece 3 attached to the one end of a bell crank lever 5 rotatably mounted on a fixed pin 4, the other end of said lever 5 carrying a counterweight 6 in order to obtain good contact between the contact piece 3 and the resistance wire 1. Connected to the two ends of the resistance wire 1 is a battery 7, an adjustable resistance 8 being inserted in this circuit. Between the contact piece 3 and the one end of the resistance wire 1, there is inserted a galvanometer 10. The wheel 2 is suitably connected to an air bell 11, communicating through a conduit 12 with a locking device, comprising a float 30 rigidly connected to a bell 31 turned over the mouth of the pipe 12. The float 30 is arranged in an enlarged portion of the ascending pipe 32, said pipe and the pipe 12 extending to a certain level into a basin 33 which is filled by mercury or other sealing liquid up to the upper mouth 34 of the pipe 32. The pipe 12 extends above the surface of the mercury into said bell 31, pipe 32 serving in this manner as an over-flow pipe so as to maintain a constant level in the basin 33. This locking device is described in detail in my co-pending application Serial No. 604,056. The measuring vessel 14 is connected in known manner to the wheel 15 fixed on the same shaft as the wheel 2 and provided with a stop 16. The wheel 2 is rotatably mounted on said shaft and provided with a projection 17 arranged in the path of movement of the stop 16 and co-operating with said stop. The movements of the wheel 2 are transmitted in known manner by a stylus 18 or the like to the chart 19.

The mode of operation is as follows:

An analysis being completed or nearly completed, and the gas from the absorption vessel in the apparatus A having been conveyed into the measuring bell 14, the wheel 15 has been rotated through an angle corresponding to the value obtained in the analysis. At or nearly at the termination of the analysis the float 30 and the bell 31 are raised by the liquid in the apparatus so that the sealing bell 11 will be brought into communication with the atmosphere through the pipe 12, said bell 11 being thereby released from its locked position and releasing in turn the wheel 2. By the cooperation of the stop 16 with the projection 17 the wheel 2 is set according to the position of the wheel 15, said rotation being transmitted to the chart by the stylus 18. On the following reduction of the pressure in the apparatus the measuring bell 14 will sink and return together with the wheel 15 to its initial position. The air bell 11 being locked by the locking device 13 of the apparatus A immediately on the pressure sinking, the wheel 2 does not partake in this movement but remains in the adjusted position until the termination of the following analysis, it being then released anew and set into a new position corresponding thereto.

So far the apparatus coincides with the apparatus disclosed in the patent application cited above. On the wheel 2 assuming a given position, current will pass from the battery 7, partly through the resistance 8 and the resistance wire 1, and partly through the resistance 8, the galvanometer 10, the contact piece 3 and the part of the resistance wire 1 situated above said contact piece 3, the last-mentioned current causing a deflection of the galvanometer. This deflection of the galvanometer is maintained, until the wheel 2 assumes a new position, the resistance wire then being rotated in relation to the contact piece causing a variation of the potential difference between the ends of the part of the resistance wire connected into the galvanometer circuit, so that the deflection of the galvanometer will be altered. By adjusting the resistance 8, the zero position of the galvanometer may be adjusted, that is to say, variations of the potential of the battery may be compensated for.

If the resistance wire 1 is arranged on the fixed wheel 15, the pointer of the galvanometer or the stylus of the galvanometer recording mechanism would return to zero on the termination of each analysis. The indication or the record of the galvanometer will thus be discontinuous.

The arrangement diagrammatically shown in Fig. 2 illustrates the use of the device in a discontinuously recording or indicating gas analyzing apparatus, that is, the apparatus is not provided with the locking means 13 shown in Fig. 1, but the wheel 2 and thus also the stylus 18 return to zero position immediately on the termination of each analysis. This returning movement is facilitated by the counterweight 20. Accordingly, the pointer of the galvanometer or the stylus of the galvanometer recording mechanism also returns to zero, the indication or the recording of the galvanometer as well as that of the mechanical recording mechanism thus being discontinuous.

In this case too, the resistance wire may be arranged on the fixed wheel 15.

In the embodiment shown in Fig. 3, the gas analyzing apparatus proper is not disclosed, two resistance wires 1 and $1^1$ are suitably stretched in parallel with the chain 21 or the like connecting the counterweight 20 with the wheel 2. Along said resistance wires 1 and $1^1$, contact pieces 3, $3^1$ are sliding, said contact pieces being electrically connected by springs 22 or the like fixed to the chain 21 and pressed against the resistance wires in order to ensure good contact. The one end of the one wire $1^1$ is connected to the one pole of a battery 7, the other pole of which is connected through an adjustable resistance 8 to the other end of said wire $1^1$. The upper ends of the wires 1 and $1^1$ are connected through a galvanometer 10.

The mode of operation is as follows:

From the battery 7, current passes partly through the one resistance wire $1^1$ and the resistance 8, and partly through the galvanometer 10, a portion of the resistance wire 1, the contact piece 3, the springs 22, the contact piece $3^1$, a portion of the resistance wire $1^1$ and the resistance 8. In a given position of the wheel 2 the contact pieces 3, $3^1$ occupy certain positions on the resistance wires 1 and $1^1$, causing a certain deflection of the galvanometer 10. If the positions of the contact pieces are altered by the rotation of the wheel 2 into a new position, the electrical resistance of the galvanometer circuit remains constant, but as now the potential difference between the contact piece 3¹ and the end of the resistance wire 1¹ connected to the galvanometer has a different value, a correspondingly altered deflection of the galvanometer 10 is obtained. This arrangement may of course be combined with the gas analyzing apparatus shown in Fig. 1, in which case the indication or the record becomes continuous, or the arrangement may be combined with the apparatus shown in Fig. 2, in which case the record or the indication becomes discontinuous.

In the embodiment of the invention shown in Fig. 4, two mercury cups 3 and 3¹ are substituted for the contact pieces, and immersed in said cups are the two branches 1 and 1¹ of a U-shaped resistance wire rigidly connected to the chain 21 or the like. Connected to the top of the wall of the one mercury cup 3¹ is a conducting wire leading to the one pole of the battery 7, and provided at the bottom of said wall are two conducting wires, one of which leads to the other pole of the battery 7 through an adjustable resistance 8, while the other is connected to a galvanometer 10, which, in turn, is connected to the other mercury cup 3 by means of a conducting wire fastened to said cup. Extending from the battery 7 are two circuits, one through the resistance 8 and the mercury cup 3¹, which is assumed to be constructed in such a manner, that a certain, rather high resistance prevails between the conducting wires, and the other through the resistance 8, the galvanometer 10, the mercury cup 3 and the two branches 1 and 1¹ of the resistance wire.

On the rotation of the wheel 2, the chain 21 is raised or lowered, whereby the branches of the resistance wire connected thereto will be immersed more or less into the mercury cups 3 and 3¹. Thus the resistance of the galvanometer circuit varies causing a deflection of the galvanometer 10.

The regulating resistance 8 serves the same purpose as the corresponding resistance in the arrangement shown in Fig. 1.

This arrangement may of course also be conceived as employed in combination with any one of the apparatus shown in Figs. 1 and 2.

What I claim as new and desire to secure by Letters Patent of the United States of America is:—

1. In a discontinuously operating gas analyzing apparatus, the combination with a movable member and means for bringing said member into a position corresponding to the result of analysis, of an electrical measuring instrument, a source of current, an adjustable resistance, electrical connections between said instrument, said source and said resistance means for locking said member substantially until the termination of each analysis and means for adjusting the resistance in conformity with the position assumed by said member when released substantially at the termination of each analysis.

2. In a discontinuously operating gas analyzing apparatus, the combination with a rotatably mounted wheel and means for bringing said wheel into a position corresponding to the result of analysis, of an electrical measuring instrument, a source of current, an adjustable resistance wire mounted on said wheel, connections between said instrument, said source and said resistance, means for locking said wheel substantially until the termination of each analysis and means for adjusting said resistance wire in conformity with the position assumed by the wheel when released substantially at the termination of each analysis.

3. In a discontinuously operating gas analyzing apparatus, the combination with a wheel and means for bringing said wheel into a position corresponding to the result of analysis, of an electrical measuring instrument, a source of current, an adjustable resistance wire mounted on said wheel, a contact piece bearing on said wire, electrical connections between said instrument and said contact piece, between said instrument and one end of said wire and between said source of current and both ends of said wire, means for locking said wheel substantially until the termination of each analysis and means for adjusting said resistance wire in conformity with the position assumed by the wheel when released substantially at the termination of each analysis.

4. In a discontinuously operating gas analyzing apparatus, the combination with a movable member and means for bringing said member into a position corresponding to the result of analysis, of an electrical measuring instrument placed at a distance from said apparatus proper, a source of current, and adjustable resistance, electrical connections between said instrument, said source and said resistance, means for locking said member substantially until the termination of each analysis and means for adjusting the resistance in conformity with the position assumed by said member when released substantially at the termination of each analysis.

In testimony whereof I affix my signature in presence of two witnesses.

OLOF RODHE.

Witnesses:
 ERIC LATGER,
 D'BOYS LINDE.